United States Patent
Kim et al.

(10) Patent No.: US 11,588,224 B2
(45) Date of Patent: Feb. 21, 2023

(54) MOBILE TERMINAL

(71) Applicant: LG ELECTRONICS INC., Seoul (KR)

(72) Inventors: Hangseok Kim, Seoul (KR); Minchul Shin, Seoul (KR); Dongjun Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/445,641

(22) Filed: Aug. 23, 2021

(65) Prior Publication Data
US 2022/0173499 A1  Jun. 2, 2022

(30) Foreign Application Priority Data

Dec. 1, 2020 (KR) .................. 10-2020-0165924
Jan. 29, 2021 (WO) ................ PCT/KR2021/001247

(51) Int. Cl.
*H04M 1/02* (2006.01)
*H01Q 1/24* (2006.01)
(Continued)

(52) U.S. Cl.
CPC .............. *H01Q 1/243* (2013.01); *H01Q 1/38* (2013.01); *H01Q 5/335* (2015.01)

(58) Field of Classification Search
CPC ......... H01Q 1/243; H01Q 1/38; H04M 1/026; H04M 1/0268; H04M 1/236; H04M 1/0237
See application file for complete search history.

(56) References Cited

U.S. PATENT DOCUMENTS

2007/0155449 A1* 7/2007 Kim .................. H04M 1/0237
455/575.4
2008/0307607 A1* 12/2008 Kim .................. H04M 1/0237
16/330
(Continued)

FOREIGN PATENT DOCUMENTS

KR       100708607       4/2007
KR      1020080109494   12/2008
(Continued)

OTHER PUBLICATIONS

PCT International Application No. PCT/KR2021/001247, International Search Report dated Aug. 26, 2021, 8 pages.

*Primary Examiner* — David E Lotter
(74) *Attorney, Agent, or Firm* — Lee Hong Degerman Kang & Waimey

(57) ABSTRACT

A mobile terminal including a first frame, and a second frame capable of switching a state thereof to an extended state by moving in a first direction from the first frame, and to a contracted state by sliding in a second direction opposite to the first direction, wherein the second frame includes a rear portion for at least partially covering a rear surface of the first frame, wherein the first frame includes a first rear surface exposed rearwardly in the contracted state, a second rear surface located frontwardly of the rear portion and not exposed to the outside in the contracted state, wherein at least a portion of the second rear surface is exposed rearwardly in the extended state, and a third rear surface covered by the rear portion in the contracted state and in the extended state.

17 Claims, 16 Drawing Sheets

(51) Int. Cl.
*H01Q 5/335* (2015.01)
*H01Q 1/38* (2006.01)

(56) References Cited

U.S. PATENT DOCUMENTS

2011/0001715 A1* 1/2011 Cha ............... H04M 1/0247
345/173
2018/0102072 A1* 4/2018 Lee ............... G06F 1/1641

FOREIGN PATENT DOCUMENTS

| KR | 1020110002365 | 1/2011 |
| KR | 1020160141255 | 12/2016 |
| KR | 1020180038605 | 4/2018 |

\* cited by examiner (b)

(a)

(a)  (b)

(a)

(b)

(a)

(b)

MOBILE TERMINAL

CROSS-REFERENCE TO RELATED APPLICATIONS

Pursuant to 35 U.S.C. § 119, this application claims the benefit of earlier filing date and right of priority to Korean Application No. 10-2020-0165924, filed on Dec. 1, 2020, and International Application No. PCT/2021/001247, filed on Jan. 29, 2021, the contents of which are all incorporated by reference herein in their entirety.

BACKGROUND

Field

The present disclosure relates to a mobile terminal, and more particularly, to a mobile terminal that has a flexible display and is capable of extending a size of a screen while the display is scrolled and slid at the same time.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

Recently, a flexible display having sufficient elasticity and capable of large deformation has been developed. The size of a mobile terminal can be varied using the deformable nature of the flexible display.

However, the mobile terminal with the variable size will have a height difference at an outer surface thereof when being extended. A hand may be caught in a place where the height difference has occurred, and discomfort may occur when gripping the mobile terminal resulted from the height difference, thereby lowering usability.

SUMMARY

The present disclosure aims to provide a mobile terminal in which switching of a state is made naturally as a slide movement of a frame is stably performed without distortion.

Provided is a mobile terminal including a first frame, and a second frame capable of switching a state thereof to an extended state by moving in a first direction from the first frame, and to a contracted state by sliding in a second direction opposite to the first direction, wherein the second frame includes a rear portion for at least partially covering a rear surface of the first frame, wherein the first frame includes a first rear surface exposed rearwardly in the contracted state, a second rear surface located frontwardly of the rear portion and not exposed to the outside in the contracted state, wherein at least a portion of the second rear surface is exposed rearwardly in the extended state, and a third rear surface covered by the rear portion in the contracted state and in the extended state, wherein there is a height difference between two of the first rear surface, the second rear surface, and the third rear surface.

The mobile terminal may further include a display unit including a fixed portion coupled to a front surface of the first frame and a variable portion extending in the first direction from the fixed portion to surround the second frame and bent toward the rear surface of the second frame, and a portion rearwardly bent of the variable portion may be disposed overlapping the third rear surface.

The rear portion may further include an accommodating portion in which the display unit located at a rear portion is located, and a covering portion covering the second rear surface in the extended state and covering the third rear surface in the contracted state.

The covering portion may have a thickness corresponding to a height difference between the first rear surface and the second rear surface.

The accommodating portion may have a thickness greater than a thickness of the covering portion, so that the accommodating portion protrudes frontwardly.

A length in the first direction of the first rear surface may be greater than a maximum movement distance in the first direction of the second frame.

The second frame may include a side portion for at least partially covering a side surface of the first frame, the first frame may include a first side surface exposed to the outside in the contracted state, a second side surface located inwardly of the side portion in the contracted state and exposed to the outside in the extended state, and a third side surface located inwardly of the side portion in the contracted state and in the extended state, and there may be a height difference between two of the first side surface, the second side surface, and the third side surface.

The first side surface, the second side surface, and the third side surface may be disposed at the same locations as the first rear surface, the second rear surface, and the third rear surface in the first direction, respectively.

The mobile terminal may further include a linear guide located between the third side surface and the side portion.

The linear guide may include a second guide located on the third side surface of the first frame, and a first guide located in the side portion, wherein the second guide is fastened to the first guide and moves in the first direction or in the second direction.

The side portion may include a metallic antenna radiator, and the mobile terminal may further include an antenna substrate disposed overlapping the first guide, wherein the antenna substrate includes a feeding unit electrically connected to the antenna radiator.

The antenna substrate may protrude laterally more than the first guide.

The second guide may include a bearing ball or a portion made of polyoxymethylene (POM) in contact with the first guide.

The mobile terminal may further include a guide roller located between the third side surface and the side portion.

The mobile terminal may further include a user input unit located in the side portion of the second frame.

The mobile terminal may further include a user input unit positioned on the second side surface of the first frame in the extended state and positioned in the side portion of the second frame in the contracted state, and the user input unit may include a force sensor located inwardly of the second side surface of the first frame.

The mobile terminal of the present disclosure may adjust the size of the screen as needed, so that both portability and usability may be achieved.

In addition, the mobile terminal of the present disclosure may increase usability in the extended state by minimizing the height difference at the outer surface of the mobile terminal that occurs when the mobile terminal is extended.

In addition, the distortion may be prevented during the slide movement, so that the stable slide movement may be achieved and the volume increase by the linear guide may be minimized.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DESCRIPTION OF SPECIFIC EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
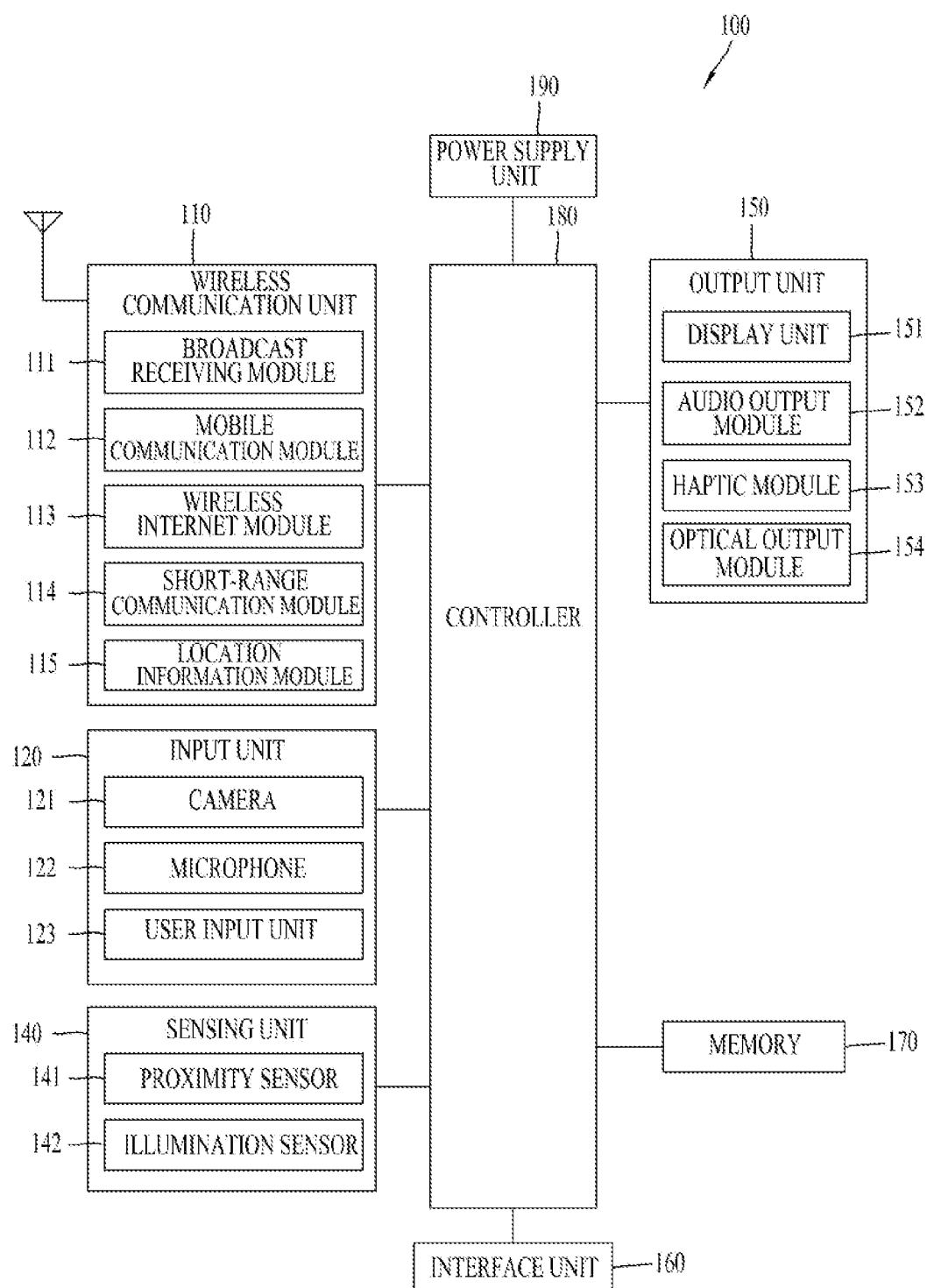
FIG. 1 is a block diagram of a mobile terminal in accordance with the present disclosure.

FIG. 1 is a block diagram of a mobile terminal in accordance with the present disclosure. The mobile terminal 100 is shown having components such as a wireless communication unit 110, an input unit 120, a sensing unit 140, an output unit 150, an interface unit 160, a memory 170, a controller 180, and a power supply unit 190. Referring now to FIG. 1, the mobile terminal 100 is shown having wireless communication unit 110 configured with several commonly implemented components. It is understood that implementing all of the illustrated components is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Figure 2:
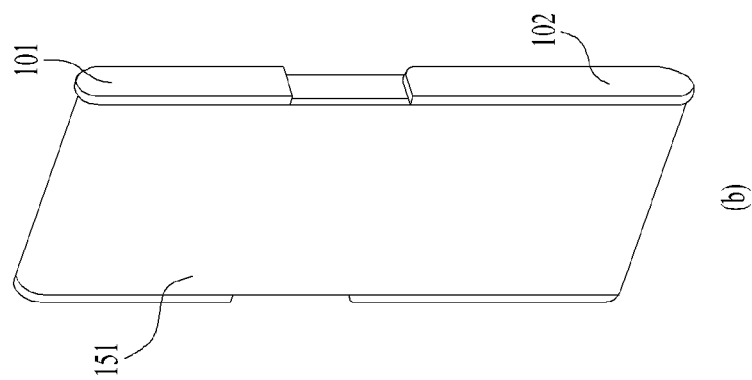
FIG. 2 is a front view of a first state and a second state of a mobile terminal.
Figure 2:
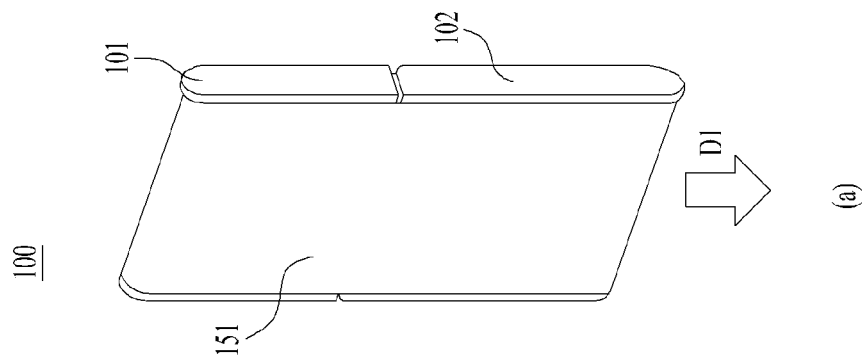
Figure 3:
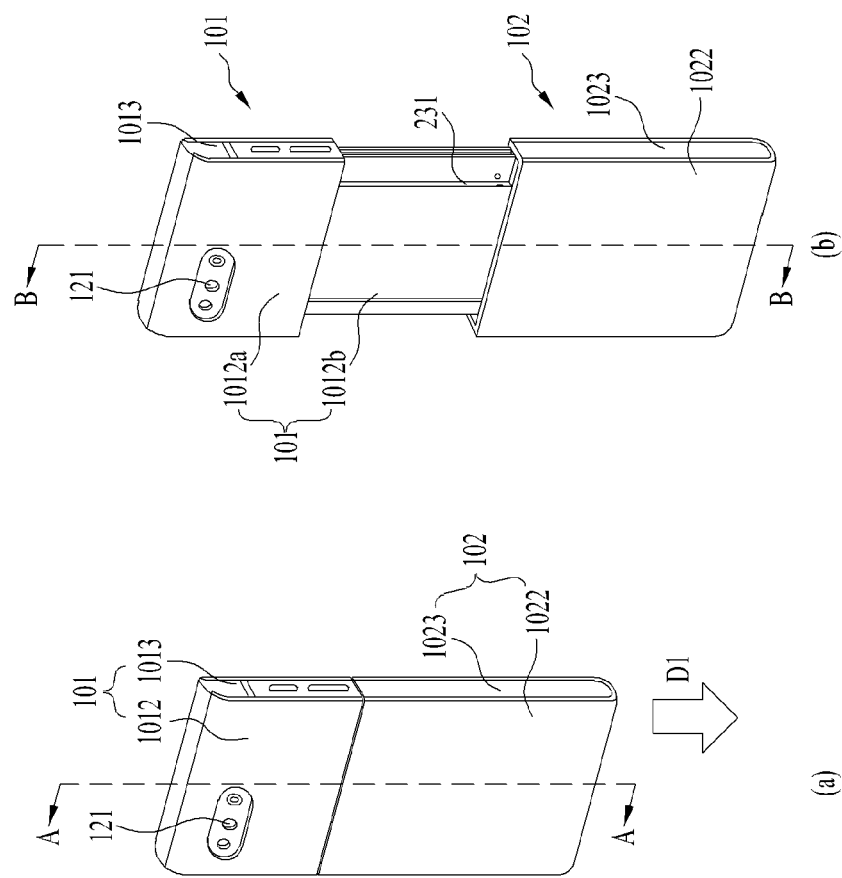
FIG. 3 is a rear view illustrating a first state and a second state of a mobile terminal.

FIGS. 2 and 3 are diagrams showing the mobile terminal 100 that may be varied in size, FIG. 2 is a front view of a first state and a second state of the mobile terminal 100, and FIG. 3 is a rear view illustrating the first state and the second state of the mobile terminal 100.

The mobile terminal 100 includes frames 101 and 102 that slide such that the size of the mobile terminal 100 may be changed. A first frame 101 and a second frame 102 that slides relative to the first frame 101 are included. When the second frame 102 moves in a first direction D1, a state of the mobile terminal 100 is switched to an extended state (a second state). In addition, when the second frame 102 moves in a second direction opposite to the first direction, the state of the mobile terminal 100 is switched to a contracted state (a first state). When the second frame 102 of the mobile terminal 100 moves in the first direction, because a user is holding a lower portion of the mobile terminal 100, that is, the second frame 102, it may be seen from a user's point of view that the mobile terminal is extended while the first frame 101 moves in an upward direction (the second direction).

That is, the movement of the second frame 102 in the first direction with respect to the first frame 101 has the same meaning as the movement of the first frame 101 in the second direction with respect to the second frame 102, and means that the state of the mobile terminal is switched to the extended state. Conversely, the movement of the second frame 102 in the second direction with respect to the first frame 101 has the same meaning as the movement of the first frame 101 in the first direction with respect to the second frame 102, and means that the state of the mobile terminal is switched to the contracted state.

In the following description, the direction in which the mobile terminal 100 and the display unit 151 thereof are extended or enlarged is defined as a first direction, and the direction in which the mobile terminal contracts or retracts or is reduced to switch from the second state to the first state is defined as a second direction. A direction perpendicular to the first and second directions is defined as a third direction. Description will be made on the assumption that the first and second directions are horizontal directions and the third direction is a vertical direction. However, depending on the arrangement of the mobile terminal 100, the first and second directions may be vertical directions and the third direction may be a horizontal direction.

(a) in FIG. 2 and (a) in FIG. 3 show the first state that is the contracted state, and (b) in FIG. 2 and (b) in FIG. 3 show the second state that is the extended state. Even in the extended state switched as the second frame 102 moves in the first direction, the first frame 101 and the second frame 102 have an overlapping portion.

In the first state, one of the first frame 101 and the second frame 102 may be disposed to surround the other and be disposed outward of the other. The first frame 101 may be disposed outward of the second frame 102 in some embodiments, and the second frame 102 may be disposed outward of the first frame 101 in some embodiments.

As shown in (b) in FIG. 3, as for a rear surface of the mobile terminal, a portion 1012b of the rear surface that was inside in the first state of the first frame 101 is exposed to the outside in the second state. The display unit 151 may be disposed to cover a front surface of the mobile terminal as shown in FIG. 2. As shown in (b) in FIG. 2, even in the extended second state, an extended portion is also covered by the display unit 151 to prevent a portion inside the mobile terminal from being exposed at the time of the extension.

An area of the display unit 151 on the front surface of the mobile terminal may vary depending on whether the frames of the mobile terminal are extended. The display unit 151 has a larger size than the frames in the first state, and includes a variable portion that may be positioned on the front surface or the rear surface of the mobile terminal depending on whether the frames are extended.

As such, a flexible display unit 151 which is bendable may be used as the display unit such that the position of the display unit may move to front side or rear side. The flexible display unit 151 may be a display unit capable of maintaining a flat state like a conventional flat panel display and capable of warping, bending, folding, twisting, or rolling like paper. The flexible display unit 151 refers to a display which is manufactured on a thin and flexible substrate and is thus lightweight and robust as not to be easily broken. The flexible display unit according the present disclosure may be bent in a specific direction, and may be arranged such that the curvature thereof may change in the first direction.

In addition, an electronic paper is a display technology to which properties of general ink are applied. The electronic paper may be different from the conventional flat panel display in using reflected light. The electronic paper may change information using a twisted ball or electrophoresis using a capsule.

In a state in which the flexible display unit 151 is not deformed (e.g., a state of having an infinite curvature radius, hereinafter referred to as a basic state), a display area of the flexible display unit 151 becomes flat. In a state in which the flexible display unit 151 is deformed by an external force from the basic state (e.g., a state of having a finite radius of curvature, hereinafter referred to as a deformed state), the display area may become a curved face. As shown, information displayed in the deformation state may be visual information output on the curved face. Such visual information is implemented by independently controlling light emission of sub-pixels arranged in a matrix. The sub-pixel refers to a minimum unit for implementing one color. When external force is applied to the flexible display unit 151, the flexible display unit 151 may be deformed to switch from the default state, which is the flat state, to a bent state, which is not the flat state.

The flexible display unit 151 may be combined with a touch sensor to implement a flexible touch screen. When a touch is made on the flexible touch screen, the controller 180 (see FIG. 1) may perform control corresponding to such touch input. The flexible touch screen may be configured to detect the touch input in the deformed state as well as in the basic state.

The touch sensor detects the touch (or touch input) applied on the touch screen using at least one of various touch schemes such as a resistive film scheme, a capacitance scheme, an infrared scheme, an ultrasonic wave scheme, a magnetic field scheme, and the like.

As an example, the touch sensor may be configured to convert a change in pressure applied on a specific portion of the touch screen, capacitance generated at the specific portion, or the like into an electrical input signal. The touch sensor may be configured such that a touch object applying a touch on the touch screen may detect touched position and area on the touch sensor, a pressure during the touch, a capacitance during the touch, and the like.

Further, the mobile terminal 100 may have a deformation detection means for detecting the deformation of the flexible display unit 151. Such deformation detection means may be included in the sensing unit 140 (see FIG. 1).

The deformation detection means may be disposed in the flexible display unit 151 or a case (first to second frames 101 to 102 to be described later) to detect information related to the deformation of the flexible display unit 151. In this connection, the information related to the deformation may include a direction in which the flexible display unit 151 is deformed, a degree of the deformation, a deformed position, a deformed time, an acceleration at which the deformed flexible display unit 151 is restored, and the like. In addition, the information related to the deformation may include various kinds of information that may be detected due to the bending of the flexible display unit 151.

In addition, the controller 180 may change information displayed on the flexible display unit 151 or generate a control signal for controlling a function of the mobile terminal 100 based on the information related to the deformation of the flexible display unit 151 detected by the deformation detection means.

The deformation of the flexible display unit 151 may vary depending on the positions of the first frame 101 and the second frame 102. As shown in FIG. 2, since the bending position on the flexible display unit 151 is determined according to the positions of the first frame and the second frame, the bending deformation position of the flexible display unit 151 and the area thereof positioned on the front may be calculated based on the positions of the first frame 101 and the first frame 102 in place of the deformation detection means of the flexible display unit 151.

The state conversion (first or second state) of the flexible display unit 151, i.e., the size change at the front and rear faces of the mobile terminal 100 of the display unit 151 based on the size change of the mobile terminal 100 may be performed manually by a force applied by the user, but may be not limited to such manual scheme. For example, when the mobile terminal 100 or the flexible display unit 151 is in the first state, the mobile terminal 100 or the flexible display unit 151 may be converted into the second state by the user or an application command without the external force applied by the user. As such, in order for the flexible display unit 151 to be automatically deformed without the external force, the mobile terminal 100 may include a driving unit 200, which will be described later.

The flexible display unit 151 of the present disclosure is bent 180 degrees by rolling around a side portion of the mobile terminal 100 facing in the first direction. Accordingly, based on the side portion of the mobile terminal 100, a part of the flexible display unit 151 is disposed on the front of the mobile terminal 100, and the other part of the flexible display unit 151 is disposed on the rear of the mobile terminal 100. For simplicity, the part of the flexible display unit 151 positioned on the front is called a front face, and the other part of the flexible display unit 151 positioned on the rear is called a rear face. As illustrated in FIG. 2, the mobile terminal may extend in the first direction or contract in the second direction opposite to the first direction. In this case, the area of the flexible display unit 151 positioned on the front changes. That is, the sizes of the front face and the rear face may be changed according to a change in the state of the mobile terminal.

The part of the flexible display unit 151 positioned on the front of the mobile terminal 100 may be immovably fixed to the front surface of the first frame 101, and the other part thereof positioned on the rear of the mobile terminal 100 may be movably arranged on the rear of the mobile terminal 100.

In addition, the flexible display unit 151 may be rolled on or released at the side portion in the first direction of mobile terminal. Accordingly, the rear face of the display unit 151 moves, so that the size of the front face of the display unit 151 may be adjusted. Since the size of the flexible display unit 151 is determined and the flexible display unit 151 is formed of one continuous body, an area of rear face of the display unit 151 decreases as an area of the front face of the display unit 151 increases. Such a display unit 151 may be rolled in a second frame 102, which is movable relative to a first frame 101 to be described later, more correctly, on one of sides of the second frame 102. The display unit 151 may be withdrawn or pulled out from or inserted or pushed into the second frame 102 while being rolled in the second frame 102 along a moving direction of the second frame 102 to adjust the area of the display unit 151 on the front face of the mobile terminal 100.

In addition, the display unit 151 may be bent 180 degrees while forming a curved surface in the second frame 102 so as to be disposed on both the front surface and the rear surface of the mobile terminal 100. For such an arrangement of the display unit 151, the second frame 102 may include a roller rotatably disposed therein. The roller may be disposed at any position inside the second frame 102.

However, the display unit 151 has to be spread flat on the front surface and the rear surface of the mobile terminal 100 in order to provide the user with a good quality screen. For such spreading, an appropriate tension must be provided to the display unit 151. To provide appropriate tension, the roller may be placed at an end in the first direction of the second frame 102. Such roller may extend in the second direction and may be rotatably coupled to the second frame 102.

The display unit 151 may be wound on the roller while being gently curved with a predetermined curvature. The flexible display unit 151 may include a first surface that outputs an image thereon and is exposed to the outside, and an inner surface facing toward the frame opposite to the first surface. The roller may be installed to freely rotate in the second frame 102 while in contact with the inner surface of the display unit 151. Accordingly, the roller may actually move the display unit 151 in a lateral direction of the mobile terminal 100, that is, in a direction perpendicular to a longitudinal direction. As will be described later, when the second frame 102 slides, by the tension applied by the second frame 102, the display unit 151 may move to the front surface or the rear surface of the mobile terminal 100 relative to the second frame 102 in different directions (i.e., the first direction D1 or the second direction D2). The roller may guide such movement while rotating.

In addition, the roller may be disposed adjacent to the end in the first direction of the second frame 102, and a side frame disposed at the end in the first direction of the second frame 102 may be included to prevent damage to the display unit 151 wound on the roller.

While extending and contracting in the first and second directions D1 and D2, the second frame 102 may overlap the first frame 101, precisely a first front portion 1011 and a first rear portion 1012 of the first frame 101 so as not to interfere with the first frame 101. More specifically, the display unit 151 may be coupled and supported by the first front portion 1011 of the first frame 101 as described above, and thus, there is no need to be additionally supported by a second front portion of the second frame 102. Rather, when the second front portion is interposed between the first front portion 1011 and the display unit 151, the display unit 151 may be deformed or damaged by friction with the repeatedly moving second front portion.

Accordingly, the second front portion may be disposed below the first front portion 1011 or may be inserted between two sheets of the first front portion 1011. A second rear portion 1022 of the second frame 102 may be disposed to face a rear surface of the first rear portion 1012 of the first frame 101. That is, a front surface of the second rear portion 1022 may face the rear surface of the first rear portion 1012. In addition, in order to stably support the movement of the second frame 102, the rear surface of the first rear portion 1012 may be in contact with the front surface of the second rear portion 1022. By such arrangement, the second rear portion 1022 may be exposed to the outside of the first frame, more precisely, of the first rear portion 1012, and may be coupled to the display unit 151.

In addition, the second frame 102 may extend and reduce the size of the mobile terminal 100 itself, particularly the front surface of the mobile terminal 100, by the extension and the contraction in the first and second directions D1 and D2. The display unit 151 has to move as much as the extended or reduced front surface in order to switch the state thereof to the intended first and second states. However, when fixed to the second frame 102, the display unit 151 is not able to be moved smoothly to fit the front surface of the mobile terminal 100 to be extended or reduced. For this reason, the display unit 151 may be movably coupled to the second frame 102.

Typically, an antenna is disposed in the case or the housing of the mobile terminal 100, but a portion where the antenna is installed in the case or the housing may be limited because of the flexible display unit 151 that covers not only the front face of the mobile terminal 100 but also the rear face thereof. For this reason, the antenna may be implemented on the flexible display unit 151. An antenna on display (AOD) is an antenna in which a transparent film is formed by stacking an electrode layer and a dielectric layer that have patterns engraved thereon, respectively. The antenna on display may be implemented thinner than an antenna implemented using a laser direct structuring (LDS) technology using a conventional copper nickel plating scheme, so that the antenna on display may not be exposed to the outside without affecting a thickness. In addition, the antenna on display may transmit and receive a signal directly to or from the display unit 151. Accordingly, the antenna on display may be used in the mobile terminal 100 in which the display unit 151 is located on the both faces of the mobile terminal 100 as in the present disclosure.

The flexible display unit 151 located on the rear surface may be disposed to be exposed to the outside, but there may be a risk of damage when an end of the display unit 151 is exposed to the outside. In addition, when the state of the mobile terminal 100 is switched to the second state, the second rear portion 1022 of the second frame covered by the display unit 151 may be exposed to expose a structure that guides the slide movement of the display unit 151. In order to avoid such problem, as shown in FIG. 3, a rear surface cover 1025 may be further included at the rear of the second frame 102 on which the display unit 151 is located.

The rear surface cover 1025 may be made of an opaque material. When the rear surface cover 1025 is transparent, information may be provided to the user by utilizing the display unit 151 located on the rear surface in the first state. For example, when the user takes a picture in a direction of the user with a camera located on the rear surface of the mobile terminal, a preview image of the camera may be viewed through the display unit 151 located on the rear surface. Alternatively, when the mobile terminal is placed with the rear surface facing upward, an alarm or the like may be provided through the display unit 151 located on the rear surface.

However, when the display unit 151 moves in the second state, an inner portion of the mobile terminal may be seen. Thus, the display unit 151 may be mirror-coated such that the inner portion of the mobile terminal is visible only in an ON state, that is, in a case in which light is emitted from the inside.

Figure 4:
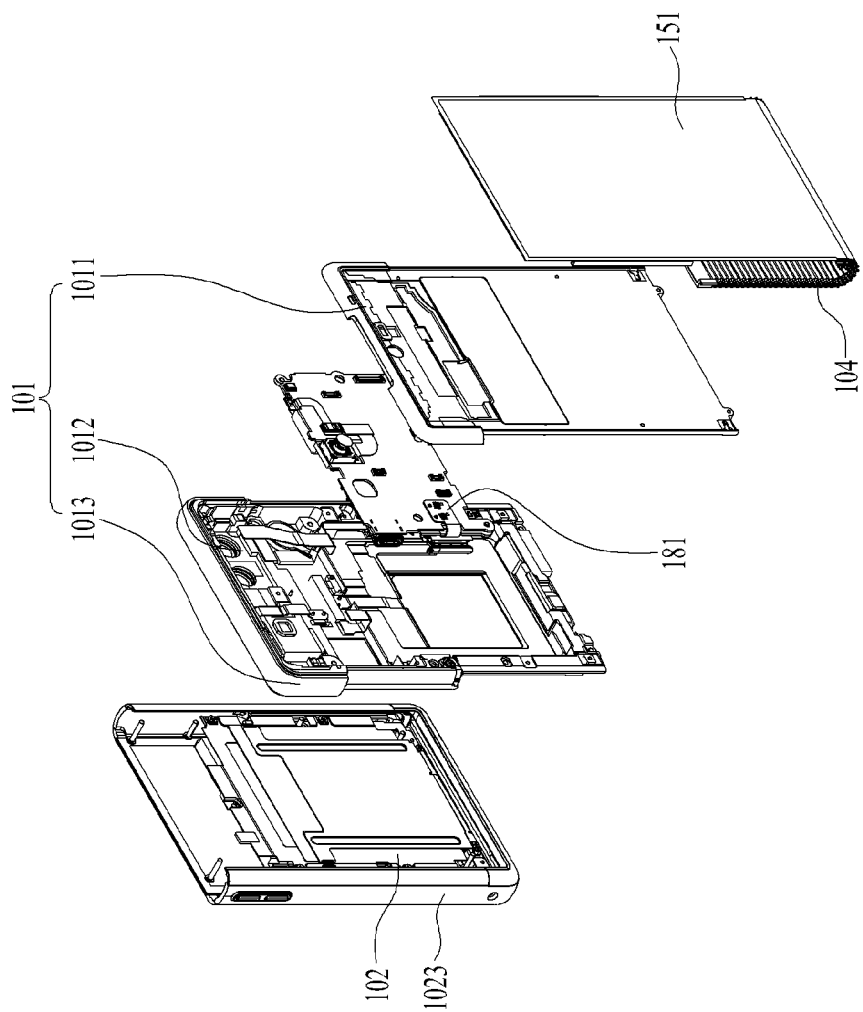
FIGS. 4 and 5 are exploded perspective views according to an embodiment of a mobile terminal.
Figure 5:
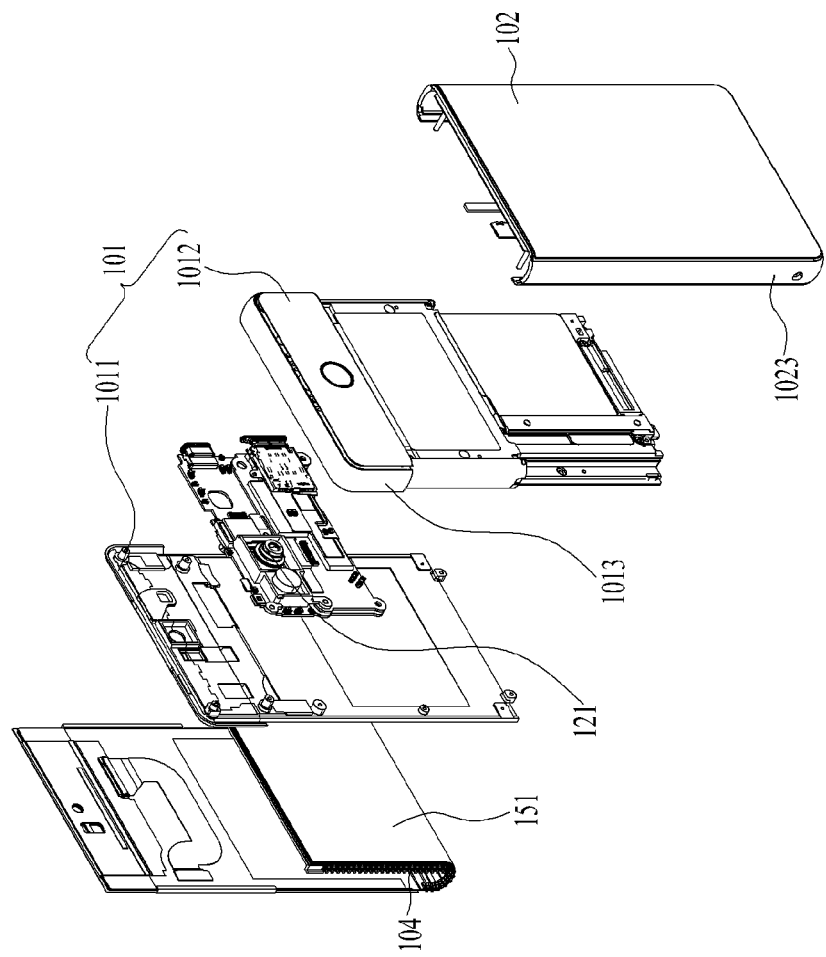

FIGS. 4 and 5 are exploded perspective views of the mobile terminal in accordance with an embodiment. FIG. 4 is an exploded perspective view of the mobile terminal as viewed from the front side, and FIG. 5 is an exploded perspective view of the mobile terminal as viewed from the rear side.

The mobile terminal 100 of the present disclosure includes frames 101 and 102 in which components are mounted, and the frames 101 and 102 of the present disclosure may vary in size in the first direction as shown in FIG. 2. One or more frames 101 and 102 move relative to each other, and sizes thereof may vary in the first direction. Electronic components are mounted in the frames 101 and 102, and the flexible display unit 151 is located out of the frames 101 and 102.

Since the mobile terminal 100 of the present disclosure includes the flexible display unit 151, the flexible display unit 151 may be combined in a form surrounding front faces and rear faces of the frames 101 and 102. The frame may include the first frame 101 and the second frame 102 moving in the first direction with respect to the first frame 101. The first frame 101 and the second frame 102 include front portions, a rear portions, and side portions, respectively, and are coupled to each other.

First, the first frame 101 may correspond to a main body of the mobile terminal 100, and may define a space for accommodating therein various parts between the first front portion 1011 and the first rear portion 1012. In addition, the first frame 101 may accommodate the second frame 102 movably coupled to the first frame 101 in such a space. More specifically, the first frame 101 may include the first front portion 1011 disposed at a front portion of the mobile terminal 100 to support a front surface of the display unit 151, and the first rear portion 1012 disposed on a rear surface of the mobile terminal and equipped with various parts.

Such first front portion 1011 and first rear portion 1012 may be spaced apart from each other at a predetermined spacing to defined the predetermined space therebetween, and may be connected to each other by a first side portion 1013. The first side portion 1013 may be formed integrally with the first rear portion 1012 or the first front portion 1011. The camera 121, the audio output module 152, an input/output terminal, the controller 180, and the power supply unit 190 may be accommodated in the space within the first frame 101 as the parts of the mobile terminal 100. For example, the controller 180 may be a circuit board 181 including a processor and an electronic circuit for controlling an operation of the mobile terminal, and the power supply unit 190 may be a battery and related parts. In addition, the driving unit 200 for controlling the slide movement of the second frame 102 to be described later may be accommodated in the first frame 101.

As described above, the display unit 151 has the continuous body, and thus, may be disposed on both the front face and the rear face of the mobile terminal 100 while being rolled in the mobile terminal 100. The display unit 151 may include the front face positioned at the front face of the mobile terminal 100, the rear face positioned at the rear face of the mobile terminal 100, and the side face positioned between the front face and the rear face thereof and surrounding the side face of the mobile terminal. The front face and the rear face of the display unit 151 are flat, and the side face of the display unit 151 may form a curved face. The flexible display unit 151 may be damaged when being bent at an angle. Thus, the flexible display unit 151 may be formed to be bent with a predetermined curvature at the side face.

The display unit 151 may be divided into a fixed portion and a variable portion. The fixed portion means a portion fixed to the frame. Because of being fixed to the frame, the fixed portion maintains a constant shape without changing a bending degree. On the other hand, the variable portion means a portion in which a bending angle or a position of the bent portion changes. The variable portion in which the position or bending angle of the bent portion changes requires a structure for supporting a rear face of the variable portion in response to the change.

The fixed portion is coupled to the first frame of the display unit and is always positioned on the front face portion of the display unit to form a portion of the front face portion of the display unit. The variable portion includes a side face located at a side portion of the mobile terminal, and a position of the side face varies depending on the position of the second frame. Based on a side face, an area of a portion disposed on the front face portion of the display unit and an area of a portion disposed on the rear face portion of the display unit vary. That is, a portion of the variable portion may be the front face and another portion of the variable portion may be the rear face based on the first and second states. The variable portion is positioned in the first direction with respect to the fixed portion relative to the mobile terminal, and an end of the variable portion is bent toward the rear face of the mobile terminal and slides on the rear face of the second frame 102.

A slide frame that guides the slide movement on a rear surface of the second frame is coupled to an end of the variable portion of the display unit. The slide frame moves in the first direction on the second frame at the same time when the second frame moves in the first direction. As a result, a moving distance of the slide frame is twice as a moving distance of the second frame with respect to the first frame. In one example, as well shown in FIG. 3, the first rear portion 1012 of the mobile terminal 100 may include a first rear surface exposed to the outside without being covered by the display unit 151 even in the first state. The physical input unit 120, such as various buttons, switches, the camera 121, and a flash, for manipulation of the mobile terminal 100, and the sensing unit 140, such as the proximity sensor 141 or a fingerprint sensor, may be disposed on the first rear surface. The first rear portion 1012 excluding a first rear surface 1012a may be covered by the display unit 151 in the first state as shown in (a) in FIG. 3, and may be exposed in a rearward direction in the second state as shown in (b) in FIG. 3.

In a typical bar-type terminal, the display unit is disposed only on the front surface of the terminal. Therefore, a main camera is disposed on the rear surface of the terminal in order for the user to photograph an object on an opposite side while looking the object through the display unit 151. In one example, an additional auxiliary camera is required on a front surface of the terminal in order for the user to take a picture of himself/herself while looking himself/herself through the display unit.

However, in the mobile terminal 100 of the present disclosure, the display unit 151 is located on both the front surface and the rear surface of the mobile terminal 100. Therefore, when the user takes the picture of himself/herself, a display unit on the same side as the camera 121, that is, a rear surface of the display unit 151 may be used. In addition, when the user photographs the object on the opposite side of the user, a front surface of the display unit 151 on a side opposite to the camera 121 may be used. For this reason, the mobile terminal 100 may photograph the object located on the opposite side of the user or photograph the user using one camera 121. The camera may include a plurality of cameras having different angles of view, such as a wide angle, a super wide angle, a telephoto, and the like. The proximity sensor, the audio output module, and the like may be located on the first rear surface 1012a in addition to the camera, and an antenna 116 may be installed on the first rear surface 1012a. An exposed decoration may be attached to the first rear surface 1012a to protect the camera, the sensing unit, and the like in consideration of an exterior design. A portion of the exposed decoration corresponding to the camera 121, the sensing unit 140, and the like may be transparent, and the remaining portion thereof may have a predetermined pattern or color in consideration of the design so as not to expose the internal parts.

The first side portion 1013 may extend along edges of the first front portion 1011 and the first rear portion 1012 to surround a perimeter in the lateral direction of the first frame 101, may form an appearance of the mobile terminal 100.

However, as mentioned above, because the second frame 102 is accommodated in the first frame 101 and is also movably coupled thereto, in order to allow the relative movement of the second frame 102 with respect to the first frame 101, a portion of the first frame 101 needs to be opened. As well shown in FIG. 2, as an example, the second frame 102 is coupled to the first frame 101 to be movable in the first direction, so that the first side portion 1013 is not formed on a side surface in the first direction of the first frame 101, thereby opening the side surface in the first direction of the first frame 101. Because the first side portion 1013 is exposed to the outside of the mobile terminal 100, the interface unit 160 for connecting a power port or an ear jack, the user input unit 120 such as a volume button, or the like may be disposed. When the first side portion 1013 contains a metal material, the first side portion 1013 may serve as an antenna. The second frame 102 may include a second front portion (not shown) disposed at the front portion of the mobile terminal 100 and a second rear portion 1022 disposed on the rear surface of the mobile terminal 100. Like the first front portion 1011 and the first rear portion 1012 of the first frame 101, the second front portion and the second rear portion 1022 may be formed of a substantially flat plate-shaped member. In addition, the second frame 102 also accommodates various parts therein, and should not interfere with the parts accommodated in the first frame 101 during the movement. Accordingly, the second front portion and the second rear portion 1022 may be coupled in a state spaced apart from each other to define a predetermined space therebetween, and may have shapes for not interfering with the parts in the first frame 101.

A second side portion 1023 that forms a side surface of the second frame 102 may be included. The first side portion 1013 may be formed long and the second side portion 1023 of the second frame 102 may be located inward of the first side portion 1013 such that only the first side portion 1013 is exposed to the outside in the first state. However, in the present embodiment, as shown in FIGS. 2 and 3, the first side portion 1013 of the first frame 101 may be formed to include a first side surface 1013a, which is a portion disposed side by side with the first rear surface 1012a and exposed to the outside, and a second side surface 1013b that is selectively exposed.

In the first state, the first side portion 1013 and the second side portion 1023 may together constitute side portions in a third direction and a fourth direction of the mobile terminal. The second side surface 1013b of the first side portion 1013 covered by the second side portion 1023 may be exposed to the outside as shown in (b) in FIG. 2 and (b) in FIG. 3 in the second state.

Figure 6:
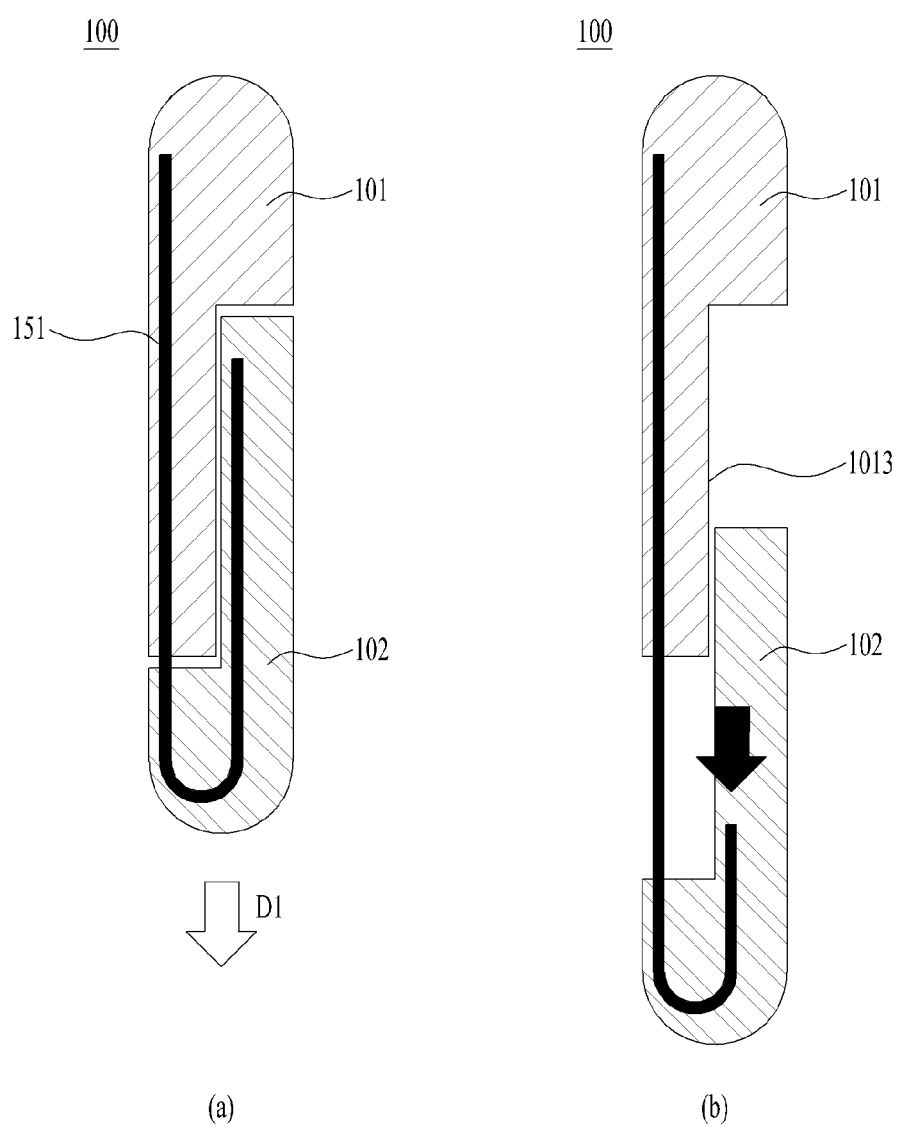
FIG. 6 shows cross-sectional views taken along a line A-A and a line B-B in FIG. 3.

(a) in FIG. 6 is a cross-sectional view taken along a A-A in FIG. 3, and (b) in FIG. 6 is a cross-sectional view taken along a line B-B, which are conceptual diagrams showing only the first frame 101, the second frame 102, and the display unit 151. In the first state, the display unit 151 positioned on the rear surface of the mobile terminal 100 may be covered with the rear surface cover 1025 as the second frame 102 is positioned at the second rear portion 1022. When the state of the mobile terminal 100 is switched to the second state, an area of the display unit 151 located on the front surface increases and an area of the display unit 151 located on the rear surface decreases.

The second rear portion 1022 of the second frame 102 needs to have a predetermined thickness because the rear surface of the display unit 151 is located and slides on the second rear portion 1022. When the state of the mobile terminal 100 is switched to the second state as shown in (b)

of FIG. 6, the second rear surface 1012b covered by the second rear portion 1022 is exposed to the outside, and the exposed second rear surface 1012b is recessed in a forward direction than the first rear surface 1012a to generate a height difference corresponding to thickness of the second rear portion 1022.

When the height difference between the first rear surface 1012a and the second rear surface 1012b is large, there is a problem of deteriorating a feeling of use because of a large sense of heterogeneity during use. In addition, when a rail 231 of a linear guide 230 for assisting the slide movement of the second frame 102 is exposed in a rearward direction of the mobile terminal 100 in the second state as shown in (b) in FIG. 3, aesthetics is impaired and an unevenness of the rail comes into contact with a hand. To increase usability, it is necessary to reduce the height difference between the first rear surface 1012a and the second rear surface 1012b.

Figure 7:
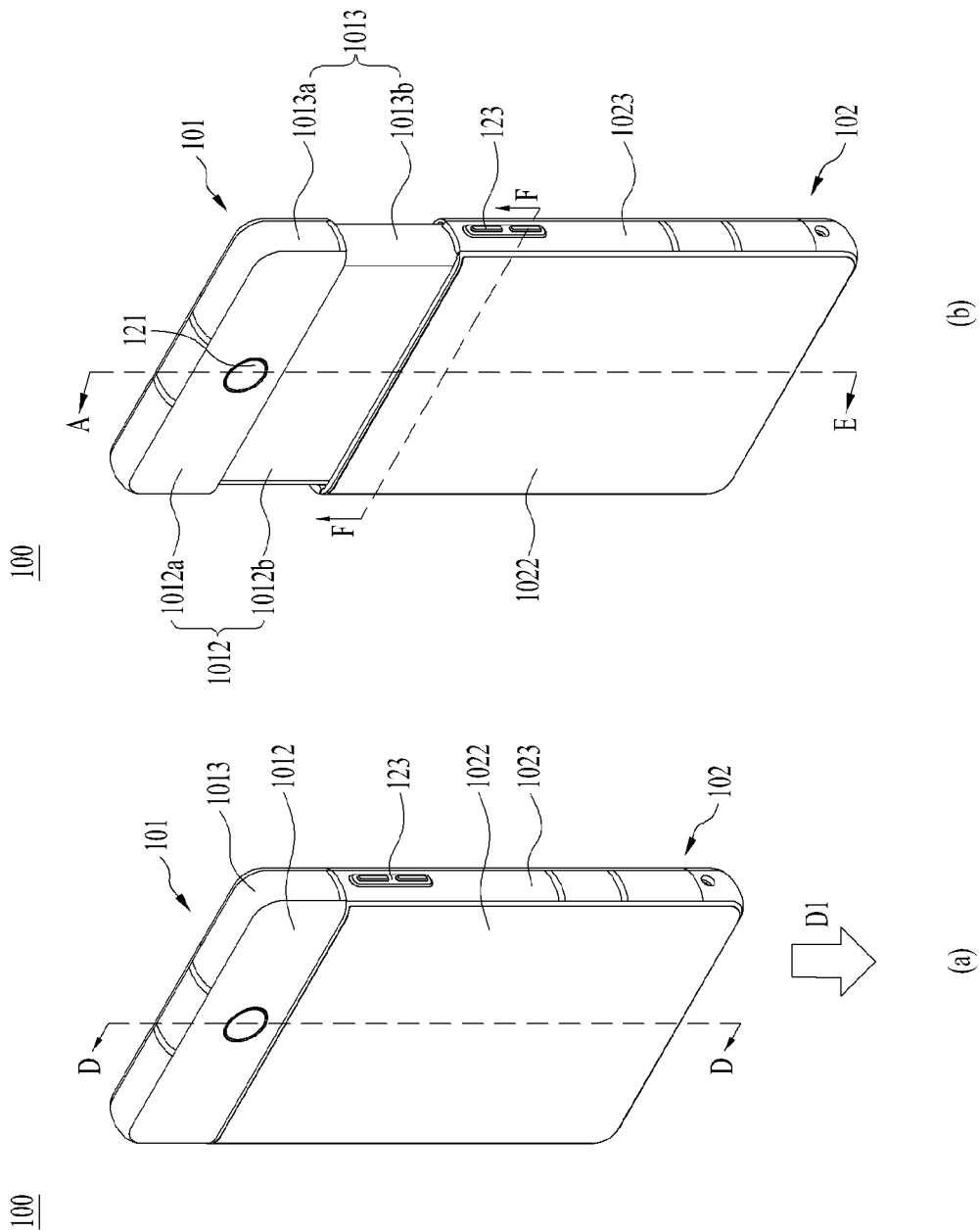
FIG. 7 shows rear views of a first state and a second state according to an embodiment of a mobile terminal.
Figure 8:
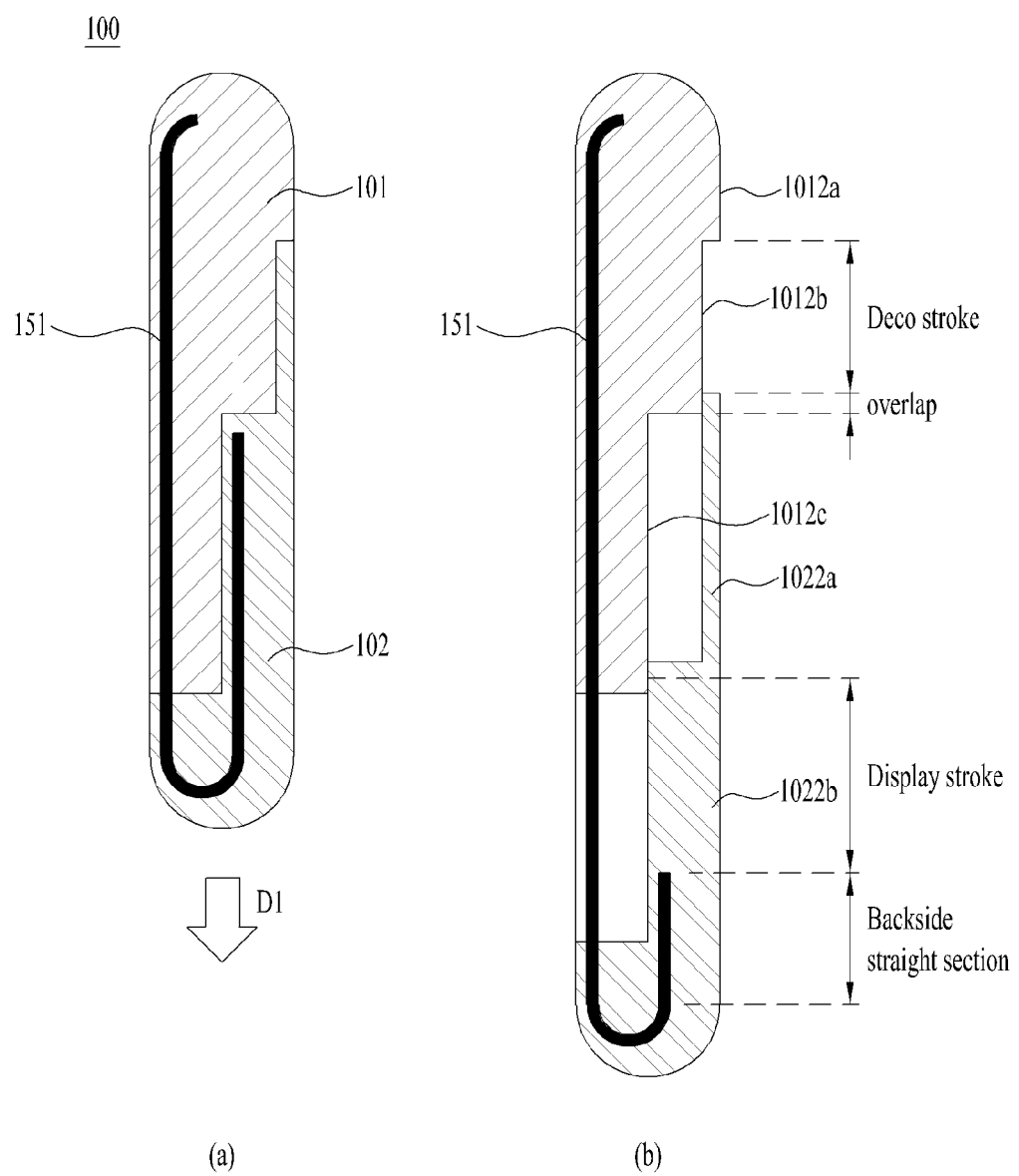
FIG. 8 shows cross-sectional views taken along a line D-D and a line E-E in FIG. 7.

FIG. 7 shows rear views of a first state and a second state according to an embodiment of a mobile terminal, and FIG. 8 shows cross-sectional views taken along a line D-D and a line E-E in FIG. 7. In the present embodiment, the rear surface of the first frame 101 is formed in multiple steps in order to reduce the height difference between the first rear surface 1012a that is always exposed and the second rear surface 1012b exposed in the second state. In the present embodiment, the rear surface of the first frame is composed of three portions with different heights, and the heights of the three portions gradually decrease to reduce the height difference between the second rear surface 1012b exposed to the outside in the second state and the first rear surface 1012a.

A size of the first rear surface 1012a that is always exposed to may be small compared to the embodiment described above to form the rear surface of the first frame 101 in the multiple steps. In addition, first frame 101 may be formed by distinguishing between the second rear surface 1012b that is covered by the second rear portion 1022 in the first state and exposed to the outside in the second state, and a third rear surface 1012c that is always located inside the second rear portion 1022 of the second frame 102.

Sections 1012a, 1012b, and 1012c of the rear surface of the first frame 101 have the height differences therebetween, the height difference between the second rear surface 1012b exposed to the outside in the second state and the first rear surface 1012a is minimized, and the third rear surface 1012c is formed so as not to be exposed to the outside, so that the bar shape of the mobile terminal 100 may be maintained even in the second state as shown in FIG. 7.

Because the third rear surface is not exposed to the outside, a frame for covering the internal parts such as the first rear surface 1012a or the second rear surface 1012b may be omitted, and the parts such as the battery may be disposed to directly face the second frame.

The second rear portion 1022 may include a covering portion 1022a that is disposed overlapping the second rear surface 1012b and an accommodating portion 1022b that is disposed overlapping with the third rear surface 1012c. The covering portion 1022a may have a thickness corresponding to a height difference between the first rear surface 1012a and the second rear surface 1012b. The covering portion 1022a serves to cover the third rear surface 1012c in the second state without mounting the parts therein. Because the covering portion 1022a is located on the second rear surface 1012b in the first state, and is able to be formed thinly, the height difference between the first rear surface 1012a and the second rear surface 1012b may be minimized.

A length of the second rear surface 1012b and a length in the first direction of the covering portion 1022a may be greater than a slide movement distance of the second frame 102 such that the third rear surface 1012c is not exposed in the second state. In the second state, the covering portion 1022a and the second rear surface 1012b may be partially overlapped each other and the covering portion 1022a may be supported so as not to be recessed inward even when being pressed by the user.

The accommodating portion 1022b, which is a portion in which the display unit 151 is located in the first state, may have a predetermined thickness to accommodate the display unit 151 therein. The third rear surface 1012c may be more recessed in the forward direction as the accommodating portion 1022b became thicker than the covering portion 1022a to accommodate the display unit 151 therein.

A magnitude of a height difference between the accommodating portion 1022b and the covering portion 1022a may correspond to a height difference between the second rear surface 1012b and the third rear surface 1012c. Even in the second state, an end in the second direction of the accommodating portion 1022b may be partially positioned on the second rear surface 1012b to support the second rear portion 1022 of the second frame 102.

The accommodating portion 1022b may have a space in which the display unit moves, and may include the rear surface cover that covers the rear surface of the display unit. The rear surface cover 1025 may be flush with the covering portion 1022a and constitute the rear surface of the second frame. That is, the rear surface cover 1025 may be extended to constitute the covering portion 1022a.

The rear surface cover 1025 may contain a light-transmitting material such that an image output from the display unit 151 positioned on the rear surface is visible through the rear surface cover 1025. The light-transmitting material may be coated or a film may be attached to the light-transmitting material to selectively transmit light. An interior of the rear surface cover 1025 is visible only when the display unit is activated, and the interior is not visible from the outside when the display unit 151 is deactivated, thereby preventing visual exposure of the internal parts.

Figure 9:
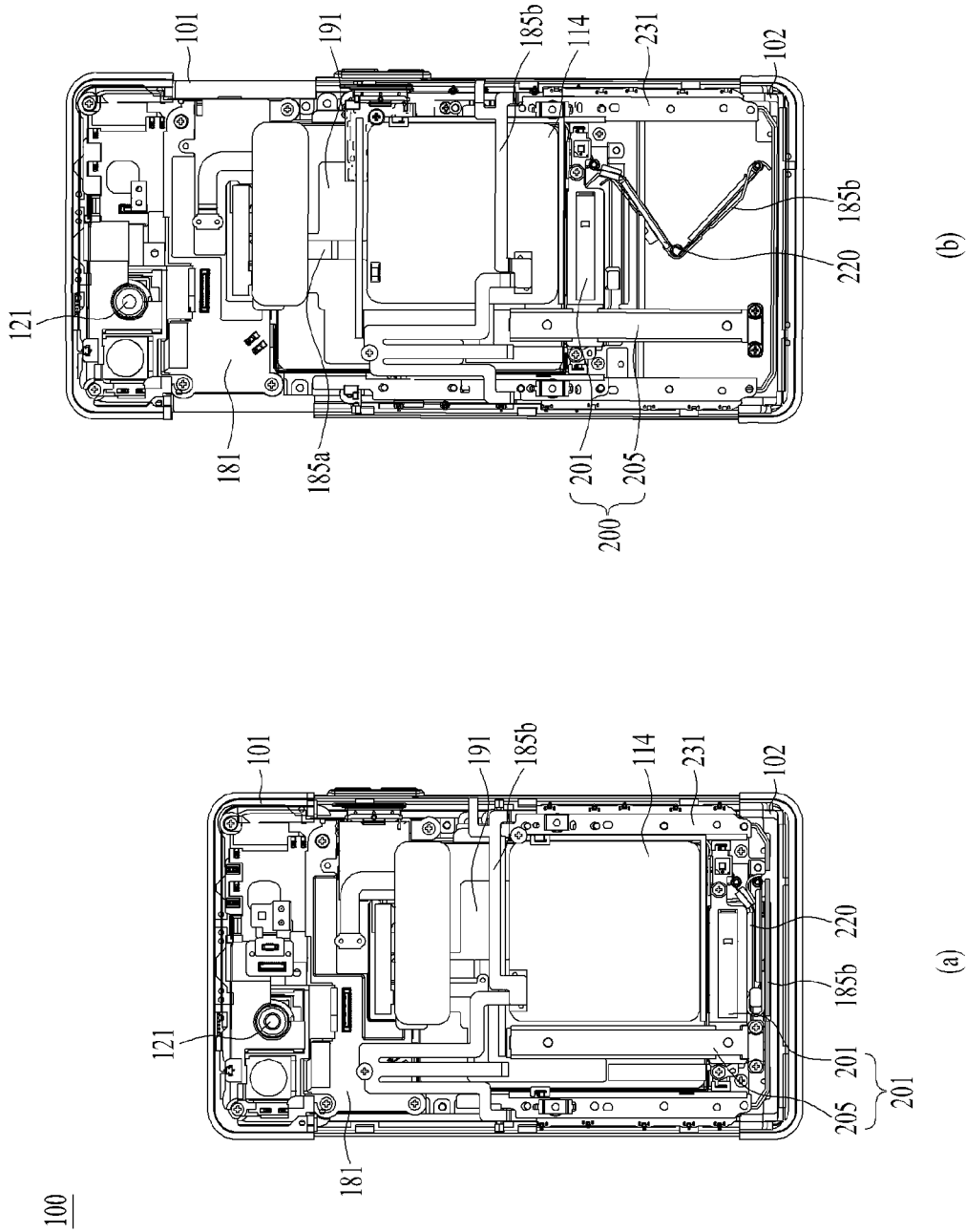
FIG. 9 is a view showing parts mounted inside a mobile terminal of the present disclosure.

FIG. 9 is a view showing parts mounted inside a mobile terminal of the present disclosure. FIG. 9 shows that the rear portions 1012 and 1022 and the rear surface cover 1025 that cover the display unit 151 and the rear surface of the mobile terminal. (a) shows the first state and (b) shows the second state. Most of the parts may be mounted inside the first frame 101. The main board 181, the battery 191, the camera 121, the motor 201 of the driving unit 200, and the like may be mounted in the first frame 101.

The battery 191, which is a part having the greatest weight inside the mobile terminal 100, is more stable to be located at a lower portion than at an upper portion in the drawing. In particular, in a case in which the battery 191 extends in a downward direction (in the first direction) as shown in (b), when the battery 191 is positioned at the upper portion, a center of gravity becomes more biased upwardly.

Therefore, in the first frame 101, the camera 121 or the main board 181 may be located at an upper portion, and the battery 191 may be disposed below the main board 181. Because the battery 191 and the main board 181 are both located in the first frame 101, there is no change in a location of the battery 191 and the main board 181 when the battery 191 and the main board 181 are connected to each other. However, in order to connect an antenna using the second side portion 1023 of the second frame 102, the user input unit 123, or the like to the main board 181, a shape of a flexible board or a cable 185*b* may be changed.

A coil antenna 114 that performs short-range wireless communication, such as a payment antenna or an NFC antenna, may be disposed on a rear surface of the battery 191. The coil antenna 114 is preferably disposed adjacent to the rear surface of the mobile terminal 100. When the coil antenna 114 is located on the rear surface of the battery 191, because the coil antenna 114 is located in the first frame 101, there is no change in a connection between the coil antenna 114 and the main board 181.

When the coil antenna 114 is disposed in the second rear portion 1022 of the second frame 102, together with the connection for connecting the user input unit 123 or the antenna using the second side portion of the second frame described above, the cable 185*b* or the flexible board 185*a* that is spread at the time of the extension may be used.

An interior of the second frame 102 in the extended second state is empty. Although a rolling hinge 104 supports the extended rear surface of the display unit 151, because the rolling hinge 104 is driven in a state caught on a slide rail of the second frame at ends in the third and fourth directions of the display unit 151, there is a problem in that a force for supporting a central portion of the display unit 151 is weak.

When the second frame 102 includes the second front portion located on the rear surface of the first front portion of the first frame 101 in the first state and located on the rear surface of the rolling hinge 104 in the second state, although the second front portion is positioned on a rear surface of the rolling hinge 104 to support the display unit 151, a thickness of the second front portion is too small to support the display unit 151.

A support link 220 may be further included to support the display unit 151 located on the rear surface of the first frame 101 in the extended state. The support link may include a first link coupled to the first frame 101 and a second link coupled to the second frame, and an angle between the first link and the second link may be varied through hinge coupling. The support link 220 is folded in the first state and unfolded in the second state to support a middle portion of the rolling hinge 104. When the second frame includes the second front portion, the support link 220 may be located on a rear surface of the second front portion.

When the support link 220 is unfolded into a straight line shape in the second state, it is difficult to switch the state of the support link 220 back to the folded state. Thus, as shown in (b) in FIG. 9, even in the extended state of the mobile terminal 100, the support link 220 is unfolded at an angle within 180 degrees.

The connection 185*b* that connects the parts mounted in the second frame 102 to the main board 181 of the first frame 101 described above may be formed to be movable with the support link 220 as shown in FIG. 9 so as not to be caught in other parts when a shape thereof changes.

The driving unit 200 includes a driving motor 101 that moves the second frame 102 in the first direction, and is located in the first frame 101, a pinion gear (not shown) that rotates by receiving a rotational force of the driving motor 101, and a rack gear 205 that engages with the pinion gear and moves linearly. In the drawing, the pinion gear is covered by the rack gear 205. The rack gear 205 extends in the first direction and engages with the second frame 102. When the driving motor 201 operates, the rack gear 205 moves the second frame 102 while moving in the first direction or the second direction.

The driving motor 201 may be disposed adjacent to an end in the first direction of the first frame 101 so as to move the second frame as far as possible. In consideration of arrangement of the battery 191 and other parts, the rack gear 205 may be disposed to be biased in the third direction. In order to prevent distortion caused by such asymmetric driving unit 200 from occurring, a component for assisting the slide movement in the first direction or the second direction of the second frame 102 is required.

Figure 10:
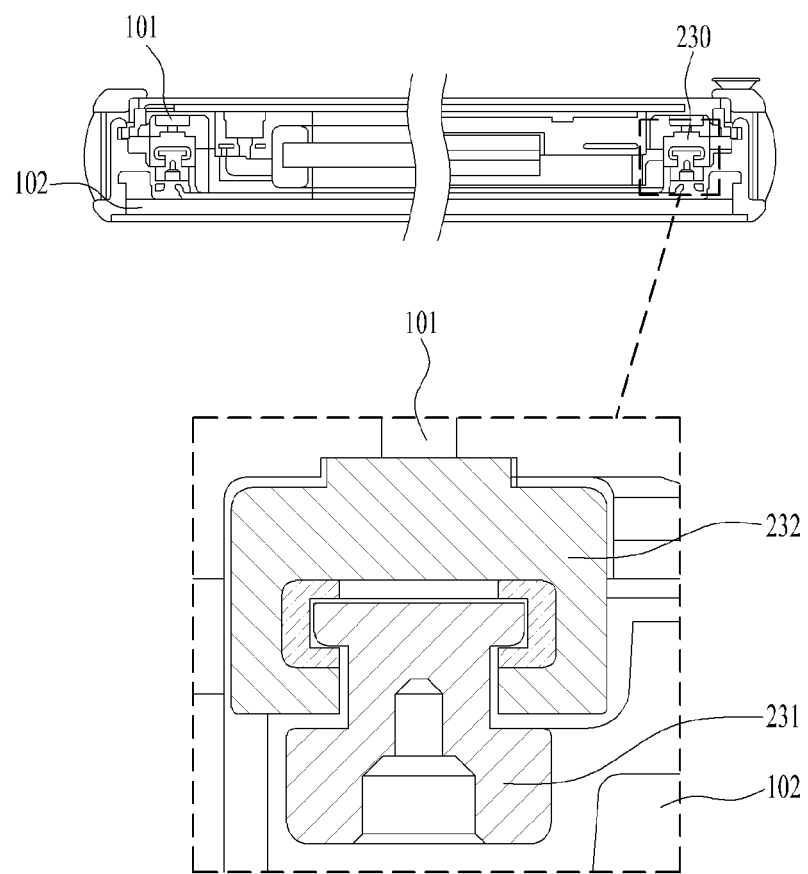
FIG. 10 is a cross-sectional view taken along a C-C in FIG. 2.

FIG. 10 is a cross-sectional view taken along a C-C in FIG. 2. In order to prevent tilting of the second frame 102 during the slide movement, the linear guide 230 that guides the slide movement in the first direction or the second direction may be further included. The linear guide 230 may include a first guide 231 extending in the first direction and a second guide 232 fastened to the first guide 231 and moving along the first guide 231. The first guide 231 and the second guide 232 may be coupled to the first frame 101 and the second frame 102, respectively.

When disposing the linear guide 230 to be directed in a front and rear direction of the mobile terminal 100 as shown in FIG. 10, because the linear guide 230 occupies a large volume, a portion in which the linear guide 230 is formed must be recessed, or the first guide 231 may be exposed to the outside as shown in (b) in FIG. 3.

Figure 11:
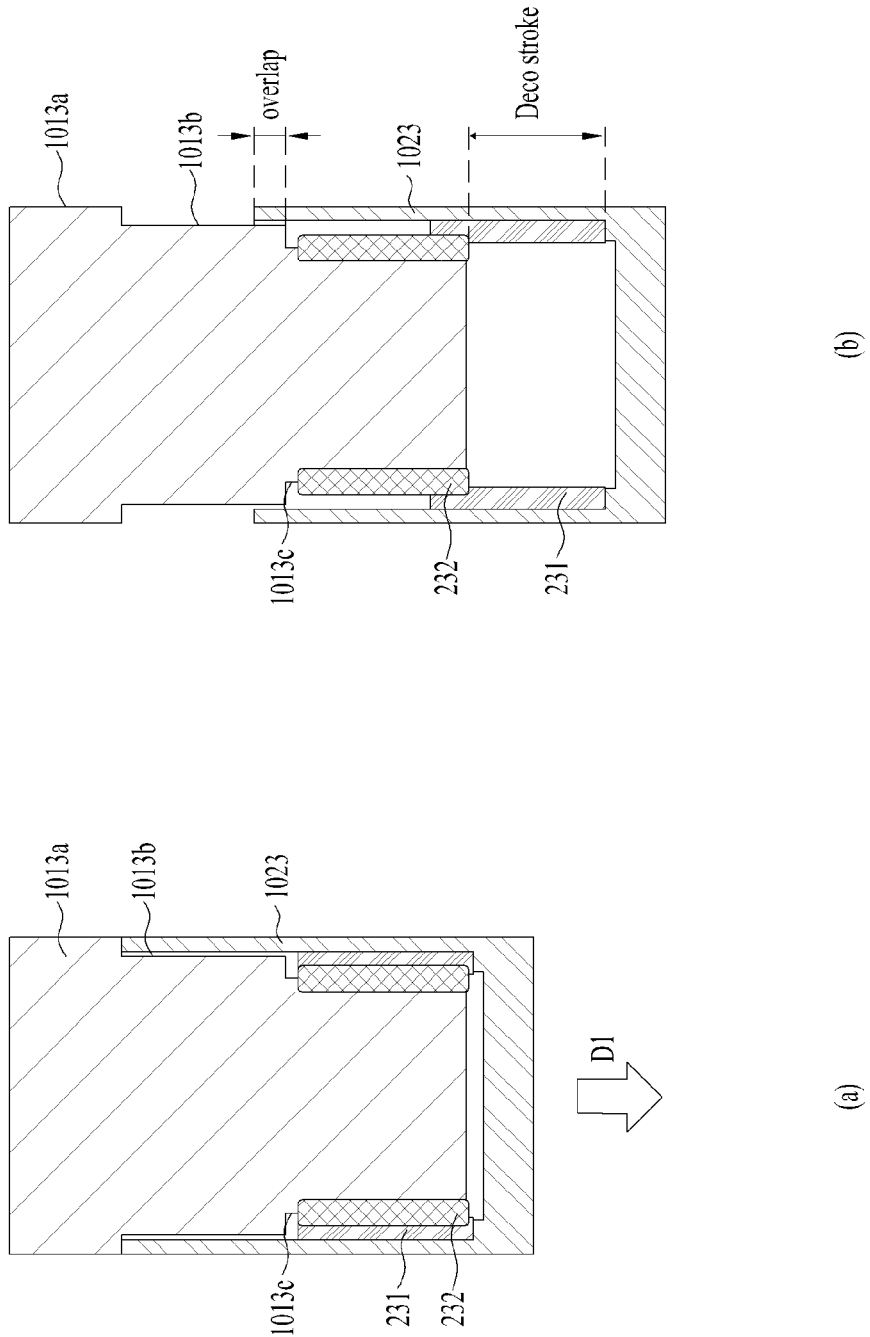
FIG. 11 is a conceptual diagram showing locations of first to third side surfaces, a side portion, and a linear guide of a mobile terminal.

FIG. 11 is a conceptual diagram showing locations of the first side surface 1013*a* to a third side surface, the side portion, and the linear guide 230 of the mobile terminal. When the first guide 231 and the second guide 232 are disposed side by side in the third direction, it is possible to prevent the thickness of the mobile terminal from increasing. However, because a space is required in the lateral direction, the side portion may also have a three-step structure like the rear surface structure described above.

The first side surface 1013*a* that is always exposed to the outside, the second side surface 1013*b* that is at least partially exposed to the outside only in the second state, and a third side surface 1013*c* that is always located inside without being exposed to the outside may be included, and height differences may exist between the first to third side surfaces 1013*a* to 1013*c*.

A length of the second side surface 1013*b* may be greater than the slide movement distance in the first direction of the second frame 102, and the linear guide 230 may be positioned on the third side surface 1013*c*. The second side surface 1013*b* may be placed side by side with the second rear surface 1012*b*, and the third side surface 1013*c* may be disposed side by side with or slightly displaced from the third rear surface 1012*c*.

The second side portion 1023 of the second frame 102 covers the second side surface 1013*b* and the third side surface 1013*c* in the first state, and the third side surface 1013*c* is recessed inwardly of the second side surface 1013*b*. thus, the linear guide 230 is disposed using a space between the third side surface 1013*c* and the second side portion 1023 of the second frame 102.

In the drawing, the first guide 231 of the linear guide 230 is shown as being coupled to the second frame 102, but the first guide 231 and the second guide 232 may be arranged in reverse. However, when it is located in the second side portion 1023 of the second frame 102, it is possible to secure a space for mounting the antenna, the user input unit, and the like in the second side portion 1023.

Figure 12:
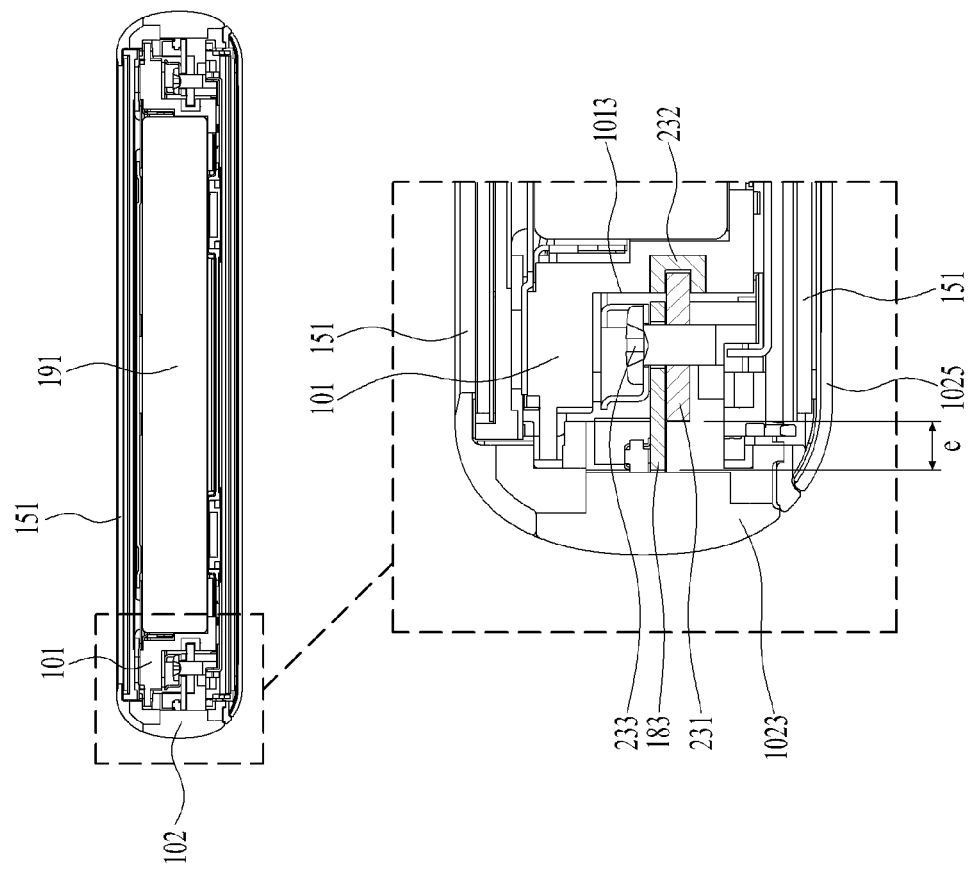
FIG. 12 is a cross-sectional view taken along a line F-F in FIG. 7.

FIG. 12 is a cross-sectional view taken along a line F-F in FIG. 7. The first guide 231 and the second guide 232 will be described in more detail with reference to FIG. 12.

In order not to increase a bezel in the third direction of the display unit 151 located on the front surface even when the third side surface 1013*c* is recessed inwardly of the second side surface 1013*b*, the linear guide 230 may be positioned facing rearward in a thickness direction of the mobile terminal.

The first guide 231 may include a plate-shaped member protruding inward from the second side portion 1023 of the second frame 102, and the second guide 232 may have a shape surrounding an end of the first guide 231. Because the second guide 232 of the form as shown in FIG. 9 increases in the volume, the second guide 232 may be formed in a U-shape surrounding the end of the first guide 231 to minimize the volume as shown in FIG. 12.

The second guide may be formed in a form of defining a groove in the side portion of the first frame rather than being added to the first frame in a block form, so that the second guide may be extended long in the first direction like the first guide.

The first guide 231 may contain a metal material for rigidity, and the second guide 232 may contain a POM material to minimize friction with the first guide 231.

Figure 13:
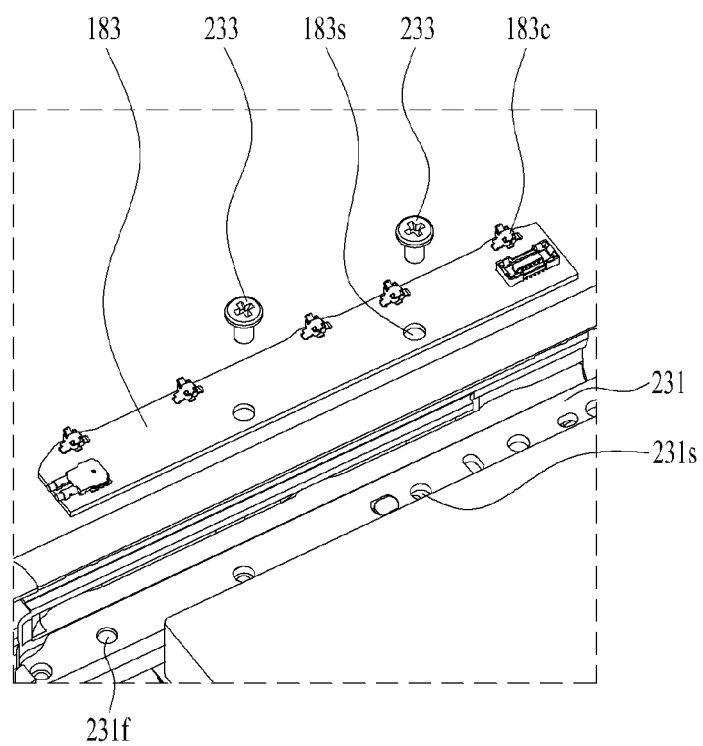
FIG. 13 is an exploded perspective view showing an antenna substrate and a first guide according to an embodiment of a mobile terminal.

The first guide 231 may be fastened through a screw 233 to the second side portion 1023 of the second frame 102, and may further include an alignment hole 231*f* for aligning a fastening position on the second frame 102 of the first guide 231 as shown in FIG. 13.

In order to implement an antenna using the first side portion 1013 or the second side portion 1023 exposed to the outside, a feeding unit that feeds the antenna should be connected. Because the first side portion 1013 is a portion of the first frame 101 in which the parts are mounted, it is easy to connect the feeding unit. However, because the first side portion 1013 is covered by the second side portion 1023, it is preferable to use the second side portion 1023 as the antenna. An antenna substrate 183 for connecting the second side portion 1023 to the wireless communication unit of the first frame 101 may be disposed.

The antenna substrate 183 may be disposed to overlap the first guide 231 as shown in FIG. 12. However, in the case in which the first guide 231 is made of the metal material, when the antenna substrate 183 is too close to a portion made of the metal used as the antenna of the second side portion 1023, there is a problem in that a performance of the antenna is deteriorated. Therefore, as shown in FIG. 12, the antenna substrate 183 may be disposed to protrude a predetermined distance e outwardly of the first guide 231.

Figure 14:
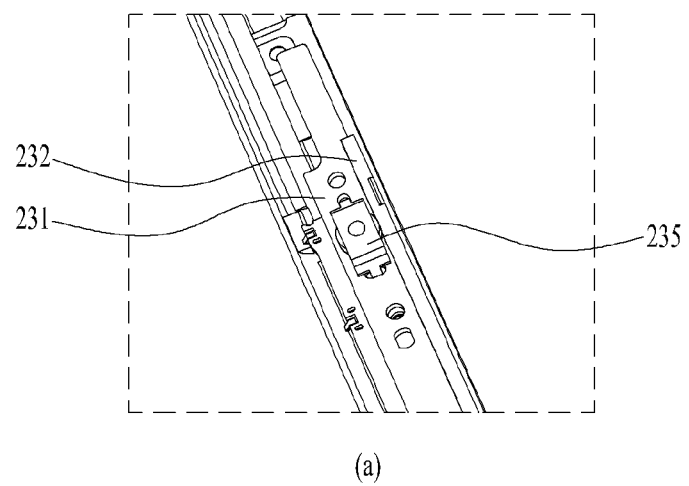
FIG. 14 is a diagram showing a state in which a side portion is separated according to an embodiment of a mobile terminal.
Figure 14:
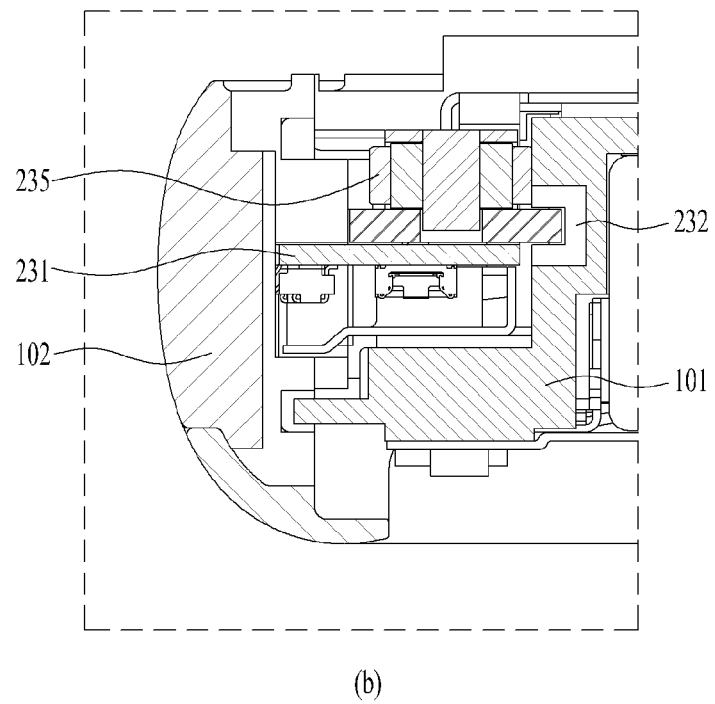

FIG. 13 is an exploded perspective view showing the antenna substrate 183 and the first guide 231 according to an embodiment of a mobile terminal, and FIG. 14 is a diagram showing a state in which a side portion is separated according to an embodiment of a mobile terminal.

The antenna substrate 183 may be fastened through the screw 233 to the first guide 231, and the first guide 231 and the antenna substrate 183 may have screw holes 231*s* and 183*s* through which the screw 233 passes, respectively. As shown in FIGS. 13 and 14, a connection pin 183*c* in contact with a metal portion of the second side portion 1023 of the second frame 102 may be formed at an outer end of the antenna substrate 183.

The linear guide 230 may have a guide roller 235 coupled to the first guide 231 as shown in FIG. 14 to prevent the second frame 102 from being tilted. In addition, because the guide roller 235 comes into contact with the third side surface 1023*c* while rotating, it is possible to reduce a frictional force generated when the second frame 102 slides.

Figure 15:
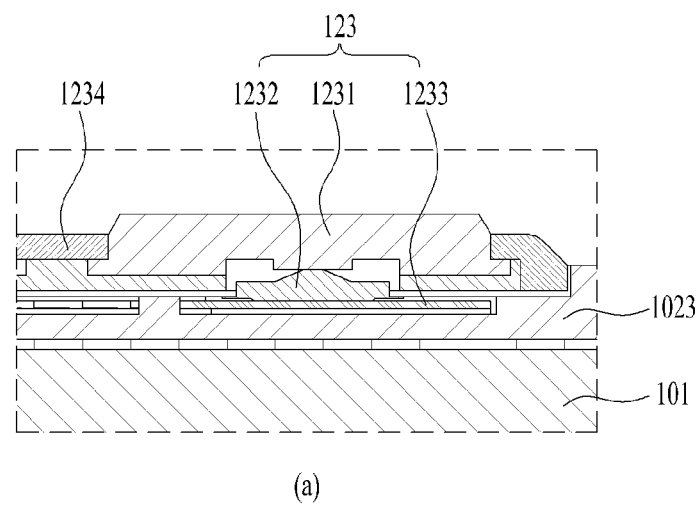
FIGS. 15 and 16 are diagrams showing a user input unit according to an embodiment of a mobile terminal.
Figure 15:
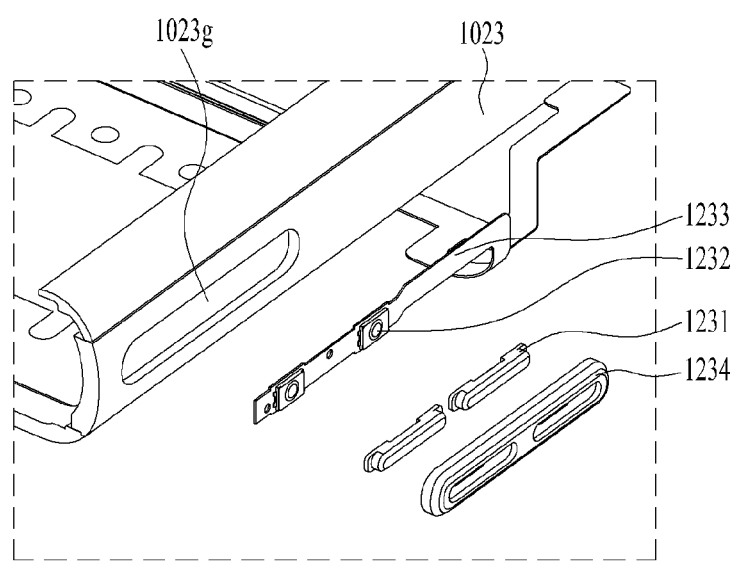
Figure 16:
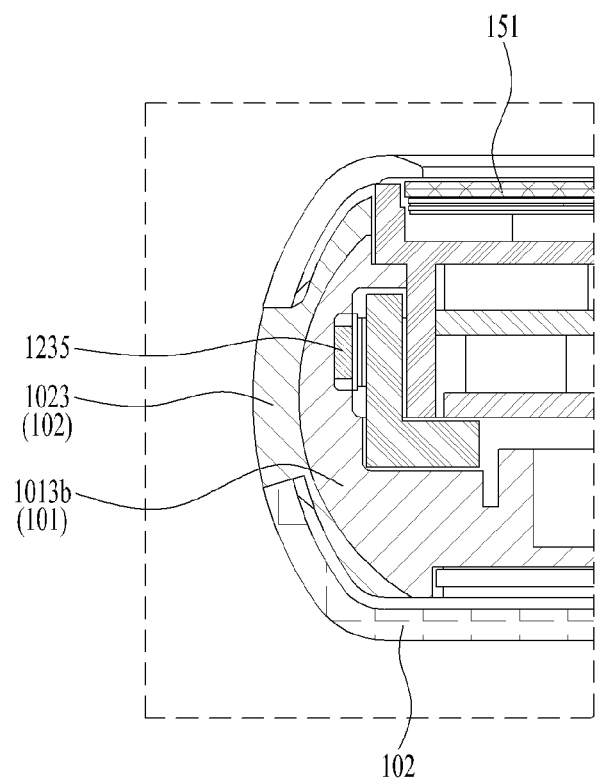

FIGS. 15 and 16 are diagrams showing the user input unit 123 according to an embodiment of a mobile terminal. As the size of the display unit 151 on the front surface of the mobile terminal 100 increases, the space for adding the user input unit 123 other than a touchpad to the front surface becomes insufficient. Instead, a button may be implemented in the lateral direction of the mobile terminal 100.

An input through the touchpad of the display unit 151 is difficult for a key, such as a volume key, used in a state of not looking at the display unit 151, or a key, such as a power button, for activating the mobile terminal in a state that the display unit 151 is turned off. Thus, it is preferable for such key to receive an input through the physical user input unit 123.

It is inconvenient in terms of usability when the user input unit is located at a too high vertical level as shown in FIG. 7, so that it is preferable to dispose the user input unit at the location where the first side portion 1013 and the second side portion 1023 overlap each other. That is, the user input unit may be located in the second side portion 1023 or the user input unit may be located on the second side surface 1013*b* of the first side portion.

FIG. 15 shows an embodiment regarding the user input unit 123 located in the second side portion 1023, and FIG. 16 shows an embodiment regarding the user input unit 123 located on the second side surface 1013*b*.

The user input unit 123 in FIG. 15, which is the user input unit 123 implemented in the side portion of the second frame 102, may be seated by defining a groove 1023*g* in the side portion of the second frame 102. A switch board 1233 having a dome switch 1232 may be seated in the groove 1023*g* of the side portion, a top button 1231 may be overlapped with the dome switch 1232, and a button cover 1234 having a hole defined therein corresponding to the top button 1231 may be inserted into the side portion to fix the top button 1231.

When a thickness of the second side portion 1023 is increased, there is a problem in that a height difference between the first side surface 1013*a* and the second side surface 1013*b* increases. Thus, the button cover 1234 may be fixed at a location outward of the side portion to minimize the increase in the overall thickness of the second side portion 1023 of the second frame 102. When the second frame 102 moves in the first direction, a location of the user input unit 123 of such type also changes in the first direction.

The user input unit 123 in FIG. 16 is positioned on the second side surface 1013*b* of the first side portion 1013 of the first frame 101. Because the second side surface 1013*b* is covered by the second side portion 1023 of the second frame, it is difficult to apply the user input unit 123 using the dome switch as in the embodiment in FIG. 15.

Instead, a user input unit may be implemented using a force sensor 1235. The force sensor 1235 is also referred to as a force touch and operates by recognizing a pressing force. As a sensor that generates an electrical signal in response to a minute mechanical change, the force sensor 1235 may sense changes in a range from several um to tens of um on an attached surface.

The force sensor 1235 does not need to be directly exposed to the outside, so that, even when the force sensor 1235 is located inward of the first side portion 1013, the force sensor 1235 may sense a pressure applied to an outer surface of the second side portion 1023. Deformation with a magnitude equal to or greater than a predetermined magnitude may be sensed as a user input and distinguished from a touch input occurring at a time of simple gripping.

Because the second side portion moves during the extension in the second state to expose the second side surface 1023*b* of the first side portion, a distance from a top of the user input unit may be kept the same as in the first state.

As described above, the mobile terminal of the present disclosure may adjust the size of the screen as needed, so that both portability and usability may be achieved.

In addition, the mobile terminal of the present disclosure may increase usability in the extended state by minimizing the height difference at the outer surface of the mobile terminal that occurs when the mobile terminal is extended.

In addition, the distortion may be prevented during the slide movement, so that the stable slide movement may be achieved and the volume increase by the linear guide may be minimized.

The above detailed description is to be construed in all aspects as illustrative and not restrictive. The scope of the present disclosure should be determined by reasonable interpretation of the appended claims and all changes coming within the equivalency range of the present disclosure are intended to be embraced in the scope of the present disclosure.

What is claimed is:

1. A mobile terminal comprising:
    a first frame comprising a front side and a rear side; and
    a second frame structured to couple with the first frame to permit relative sliding movement of the first frame and the second frame in first and second directions, wherein the first frame and the second frame are positionable between an extended state and a contracted state,
    wherein the second frame includes a front side and a rear side, wherein the rear side of the second frame is structured to cover at least a portion of the rear side the first frame,
    wherein the rear side of the first frame includes:
    a first rear surface being exposed to an outside rearwardly while in the contracted state and while in the extended state;
    a second rear surface facing the rear side of the second frame while in the contracted state and not being exposed to the outside while in the contracted state, and wherein at least a portion of the second rear surface is exposed to the outside rearwardly in the extended state; and
    a third rear surface covered by the rear side of the second frame in both the contracted state and in the extended state, and
    wherein respective heights of the first rear surface, the second rear surface, and the third rear surface, are different.

2. The mobile terminal of claim 1, further comprising:
    a display including a fixed portion coupled to a front surface of the first frame and a variable portion extending in the first direction from the fixed portion and being bent toward the rear side of the second frame,
    wherein the rear side of the second frame includes an accommodating portion for accommodating a portion of the variable portion bent toward the rear surface.

3. The mobile terminal of claim 2, wherein the rear side of the second frame further includes a covering portion extending in the second direction from the accommodating portion, wherein the covering portion covers the second rear surface while in the extended state and covers the third rear surface while in the contracted state.

4. The mobile terminal of claim 3, wherein the covering portion has a thickness corresponding to a height difference between the first rear surface and the second rear surface.

5. The mobile terminal of claim 3, wherein the accommodating portion has a thickness greater than a thickness of the covering portion, so that the accommodating portion protrudes frontwardly.

6. The mobile terminal of claim 3, wherein the accommodating portion includes a light-transmitting rear surface cover positioned on a rear surface of the display,
    wherein the light-transmitting rear surface cover is flush with the covering portion.

7. The mobile terminal of claim 1, wherein a length of the first rear surface in the first direction is greater than a maximum movement distance in the first direction of the second frame relative to the first frame.

8. The mobile terminal of claim 1, wherein the second frame includes a side portion for at least partially covering a side surface of the first frame,
    wherein the first frame includes:
    a first side surface exposed to the outside while in the contracted state;
    a second side surface located inwardly of the side portion while in the contracted state and exposed to the outside while in the extended state; and
    a third side surface located inwardly of the side portion while in the contracted state and while in the extended state,
    wherein respective heights of the first side surface, the second side surface, and the third side surface, are different.

9. The mobile terminal of claim 8, wherein the first side surface, the second side surface, and the third side surface are disposed at respectively same locations as the first rear surface, the second rear surface, and the third rear surface.

10. The mobile terminal of claim 8, further comprising a linear guide located between the third side surface and the side portion.

11. The mobile terminal of claim 10, wherein the linear guide includes:
    a second guide located on the third side surface of the first frame; and
    a first guide located in the side portion, wherein the second guide is fastened to the first guide to permit movement in the first direction and in the second direction.

12. The mobile terminal of claim 11, wherein the side portion includes a metallic antenna radiator, and
    wherein the mobile terminal further includes an antenna substrate disposed overlapping the first guide, wherein the antenna substrate includes a feeding unit electrically connected to the antenna radiator.

13. The mobile terminal of claim 12, wherein the antenna substrate protrudes laterally more than the first guide.

14. The mobile terminal of claim 11, wherein the second guide includes a bearing ball or a portion made of polyoxymethylene (POM) in contact with the first guide.

15. The mobile terminal of claim 8, further comprising a guide roller located between the third side surface and the side portion of the second frame.

16. The mobile terminal of claim 8, further comprising a user input unit located in the side portion of the second frame.

17. The mobile terminal of claim 8, further comprising a user input unit positioned on the second side surface of the first frame while in the extended state and positioned in the side portion of the second frame while in the contracted state,
    wherein the user input unit includes a force sensor located inwardly of the second side surface of the first frame.

* * * * *